United States Patent
Handelman (10) Patent No.: US 12,308,879 B2
(45) Date of Patent: May 20, 2025

(54) SYSTEM AND METHOD FOR BI-DIRECTIONAL TRAIN TO INFRASTRUCTURE WIRELESS OPTICAL COMMUNICATION

(71) Applicant: Lakuruma Systems Ltd., Mevasseret Zion (IL)

(72) Inventor: Amir Handelman, Hod Hasharon (IL)

(73) Assignee: LAKURUMA SYSTEMS LTD., Mevasseret Zion (IL)

( * ) Notice: Subject to any disclaimer, the term of this patent is extended or adjusted under 35 U.S.C. 154(b) by 410 days.

(21) Appl. No.: 17/658,151

(22) Filed: Apr. 6, 2022

(65) Prior Publication Data

US 2022/0321216 A1   Oct. 6, 2022

Related U.S. Application Data (60) Provisional application No. 63/171,083, filed on Apr. 6, 2021.

(51) Int. Cl.
*H04B 10/112* (2013.01)
*H04W 4/44* (2018.01)

(52) U.S. Cl.
CPC .......... *H04B 10/1123* (2013.01); *H04W 4/44* (2018.02)

(58) Field of Classification Search
CPC ............ H04B 10/1123; H04B 10/1129; H04B 10/112; H04B 1/3822; H04B 10/116; H04B 10/1143; H04B 10/1127; H04B 10/1125; G08G 1/052; G08G 1/056; G08G 1/07
See application file for complete search history.

(56) References Cited

U.S. PATENT DOCUMENTS

| | | |
|---|---|---|
| 6,128,559 A | 10/2000 | Saitou et al. |
| 6,507,366 B1 | 1/2003 | Lee |
| 10,009,107 B2 | 6/2018 | Segura et al. |
| (Continued) | | |

FOREIGN PATENT DOCUMENTS

WO   WO-2020166663 A1 * 8/2020 ................ B61L 1/14

OTHER PUBLICATIONS

Abadi et al., "A Space Division Multiplexed Free-Space-optical Communication System that Can Auto-Locate and Fully Self Align with a Remote Transceiver", Scientific Reports: Nature Research, 2019.

(Continued)

*Primary Examiner* — Hibret A Woldekidan
(74) *Attorney, Agent, or Firm* — M&B IP Analysts, LLC.

(57) ABSTRACT

A system and method for generating a continuous line-of-sight optimized optical communication between a public transportation vehicle and an infrastructure are provided. The method determining a location of at least one infrastructure unit along a predetermined route; detecting an approaching public transportation vehicle; determining a speed of the public transportation vehicle by an accelerometer; computing a position of the public transportation vehicle with respect to the at least one infrastructure unit based on the speed; and establishing a bi-directional link based on modulated light emitted from the public transportation vehicle and from the at least one infrastructure unit based on the position of the public transportation vehicle train.

17 Claims, 7 Drawing Sheets

(56) References Cited

U.S. PATENT DOCUMENTS

| | | | | |
|---|---|---|---|---|
| 2008/0187318 | A1* | 8/2008 | Osanai | H04B 10/116 |
| | | | | 398/129 |
| 2011/0050461 | A1* | 3/2011 | Pixley | G08G 1/056 |
| | | | | 340/933 |
| 2018/0079405 | A1* | 3/2018 | Gaither | B60W 10/10 |
| 2019/0049720 | A1* | 2/2019 | Bardagjy | G02F 1/29 |
| 2019/0187292 | A1* | 6/2019 | Masuike | H04M 1/72457 |
| 2019/0257927 | A1* | 8/2019 | Yao | G01S 7/4815 |
| 2020/0349836 | A1* | 11/2020 | Shibata | G08G 1/0965 |
| 2020/0370890 | A1* | 11/2020 | Hamilton | G08G 1/04 |
| 2021/0229716 | A1* | 7/2021 | Carlson | B61L 1/08 |
| 2021/0362756 | A1* | 11/2021 | Yoshikawa | B61L 1/14 |

OTHER PUBLICATIONS

Algorri et al., "Multifunctional Light Beam Control Device by Stimuli-Responsive Liquid Crystal Micro-Grating Structures", Scientific Reports: Natures Reports, 2020.

Axelrod et al., "Tunable Resonance-Domain Diffraction Gratings Based on Electrostrictive Polymers", Applied Optics, vol. 56, No. 7, Mar. 1, 2017, pp. 1817-1825.

Chen et al., "5G Oriented Optical Communications in high-speed Trains: A Review", The 28th Wireless and Optical Communication conference (WOCC 2019), Holon Academic Institute of Technology.

Dabiri et al., "FSO Communication for High Speed Trains: Blind Data Detection and Channel Estimation" IEEE Xplore: Holon Academic Institute of Technology, Dec. 30, 2020.

Fan et al., "Reducing the Impact of Handovers in Ground-to-Train Free Space Optical Communications", IEEE Transactions on Vehicular Technology, vol. 67, No. 2, Feb. 2018.

Fan et al., "Reducing the Number of FSO Base Stations with Dual Transceivers for Next-Generation Ground-to-Train Communications", IEEE Transactions on Vehicular Technology, vol. 67, No. 11, Nov. 2018.

Gao et al., "Average Capacity of Ground-to-train Wireless Optical Communication Links in the Non-Kolmogorov and Gamma-Gamma Distribution Turbulence With Pointing Errors", Optics Communications 358 (2016) pp. 147-153.

Haouas et al., "Extension of the Span and Optimization of the Optical 'Magic Carpet': Generation of a Wide Quasi-Nondiffracting Light Sheet", Journal of the Optical Society of America, vol. 36, No. 1, Jan. 2019.

Haruyama et al., "New Ground-to-Train High-Speed Free-Space Optical Communication System with Fast Handover Mechanism" Optical Society of America, Holon Academic Institute of Technology, Dec. 26, 2020.

Heddebaut et al., "Towards a Resilient Railway Communication Network Against Electromagnetic Attacks", TRA: Transport Research Arena, Apr. 2014, France.

Kaur et al., "Performance Analysis of Free Space Optical Communication Systems for High-Speed Trains", IEEE-45670, 10th ICCCNT-2019, Kanpur, India.

Kazerooni et al., "Optimal Positioning of Ground Base Stations in Free-Space Optical Communications for High-Speed Trains", IEEE Transactions on Intelligent Transportation Systems, vol. 19, No. 6, Jun. 2018.

Kotake et al., "A New Ground-to-Train Communication System Using Free-Space Optics Technology", WIT Transactions on The Built Environment, vol. 88, 2006 WIT Press.

Mohan et al., "Sectorized Base Stations for FSO Ground-to-Train Communications", IET Journals: The Institution of Engineering and Technology, May 6, 2020.

Nakamura et al., "Development of Broadband Telecommunications System for Railways Using Laser Technology", Electrical Engineering in Japan, vol. 190, No. 3, 2015.

Paudel et al., "Modelling of Free Space Optical Link for Ground-to-Train Communications Using a Gaussian Source", IET Optoelectron, vol. 7, Issue 1, pp. 1-8, 2013.

Shaltout et al., "Spatiotemporal Light Control with Active Metasurfaces", Science Research 364, 2019.

Stumpe et al., "Electrically Tunable Diffractive Optical Elements and DFB Lasers Based on Polymer-LC Composites and Elastomers", Fraunhofer Institute for Applied Polymer Research, Potsdam, Germany.

Taheri et al., "Provisioning Internet Access Using FSO in High-Speed Rail Networks", IEEE Network—Jul./Aug. 2017, Holon Academic Institute of Technology, 2017, pp. 96-101.

Urabe et al., "High Data Rate Ground-to-Train Free-Space Optical Communication System", Optical Engineering 51 (3), 031204, Mar. 2012.

Wang et al., "Liquid-Crystal Blazed-Grating Beam Deflector" Applied Optics, vol. 39, No. 35, Dec. 10, 2000, pp. 6545-6555.

Yue et al., "Millimeter-Wave System for High-Speed Train Communications Between Train and Trackside: System Design and Channel Measurements", IEEE Transactions on Vehicular Technology, vol. 68, No. 12, Dec. 2019.

Yuksel et al., "Free-Space-Optical Mobile Ad Hoc Networks: Auto-Configurable Building Blocks" Springer Science + Business Media, Wireless Network (15), 2009, pp. 295-312.

Zhou et al., "Broadband Wireless Communications on High Speed Trains", IEEE 2011.

* cited by examiner

SYSTEM AND METHOD FOR BI-DIRECTIONAL TRAIN TO INFRASTRUCTURE WIRELESS OPTICAL COMMUNICATION

CROSS-REFERENCE TO RELATED APPLICATIONS

This application claims the benefit of U.S. Provisional Patent Application No. 63/171,083 filed on Apr. 6, 2021, the contents of which are hereby incorporated by reference.

TECHNICAL FIELD

The present disclosure relates generally to public transportation, and more specifically to communication between trains and other trains or infrastructure.

BACKGROUND

Connected vehicles are gaining market share across various industries, from autonomous cars to public transportation (buses and trains). These vehicles will play a central role in any smart city, in which transportation and infrastructure will be constantly communicating between them. Such vehicles require highly effective communication systems with no reception limitations and must operate quickly, in real-time, transferring crucial data to the cloud and to related systems. Specifically in trains, high-speed internet connectivity is becoming an integral and necessary conduit in conducting our daily lives, and providing internet access on board trains is one of the main incentives the railway operators can offer to attract more passengers.

Additionally, many scenarios require communication between trains and infrastructure, for example Wi-Fi. Onboard Wi-Fi network relies on towers along the trains' route installed by cellular companies. The bandwidth provided by these towers is limited because of the train's speed and depends on the number of users that share it. As such, the Wi-Fi is very limited to passengers in trains, preventing them to fully exploit the internet experience such as access to streaming media and downloading or uploading large files.

Further benefit from train's connectivity is train telemetry, including additional source of train positioning information, air conditioning monitoring, drivers' skills and physiological condition monitoring, predictive maintenance, ridership analytics for the transport operator, computer-based train control utilizing the same infrastructure as the passenger Wi-Fi, and intelligent security through integration of Wi-Fi, CCTV, face recognition and Wi-Fi users' identification.

While many trains are equipped with communication equipment that relay vehicle information and data to a receiver, the communication technology currently used in trains involves radio frequency (RF) communication, such as cellular wireless technology using a Global System for Mobile Communications (GSM) network, a Long-Term Evolution (LTE) network, IEEE 802.11, mmWaves and the like. Disadvantages of using RF-based technology include limited bandwidth, electromagnetic (EM) interference with weather, other trains and infrastructure, and limited reception. Furthermore, such communication protocols require a cellular tower to act as an intermediary relay to receive and transmit signals between trains and nearby vehicles, trains, or infrastructure. Further, such communication protocols can be more prone to malicious cyber-attacks, as the radio signal can be intercepted and modified from far distances using various methods and equipment employed by bad actors.

Optical communication offers an ideal connection alternative. Optical communication offers data transfer rates that exceed the rate used by currently available dedicated short-range communication (DSRC) and offer a direct connection that does not rely on an external network. As they rely on direct line-of-sight communication, distant bad actors have limited access to such communications. Thus, these systems are a desirable alternative to currently employed communication systems for "smart" trains.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for generating a continuous line-of-sight optimized optical communication between a public transportation vehicle and an infrastructure. The method comprises determining a location of at least one infrastructure unit along a predetermined route; detecting an approaching public transportation vehicle; determining a speed of the public transportation vehicle by an accelerometer; computing a position of the public transportation vehicle with respect to the at least one infrastructure unit based on the speed; and establishing a bi-directional link based on modulated light emitted from the public transportation vehicle and from the at least one infrastructure unit based on the position of the public transportation vehicle train.

Certain embodiments disclosed herein also include a system a generating a continuous line-of-sight optimized optical communication between a public transportation vehicle and an infrastructure, comprising: a light line generation unit comprising a programmable diffractive optical element (DOE); an optical communication device (OCD) located at a public transportation vehicle wagon operatively connected to the DOE and configured to: support a continuous bi-directional communication between the public transportation vehicle and the infrastructure, wherein the OCD is configured to transmit light at a first wavelength $\lambda_1$ and to receive light at a second wavelength $\lambda_2$, and wherein the infrastructure is configured to transmit light at the second wavelength $\lambda_2$ and to receive light at the first wavelength $\lambda_1$.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Some example embodiments include a system and method for generating a continuous line-of-sight optimized optical communication for train to infrastructure autonomous vehicles. The system includes a light line generation unit, equipped with programmable diffractive optical element (DOE), a cylinder lens, a filter, and an optical communication device (OCD) is presented. The system is configured to support a continuous bi-directional communication between train and the infrastructure. In an embodiment, an OCD located at the train wagon transmits at wavelength $\lambda_1$, and is configured to receive light at wavelength $\lambda_2$, while the infrastructure transmits at wavelength $\lambda_2$ and receives light at wavelength $\lambda_1$. The DOE is programmed by the use of accelerometers and other velocity sensors. In an embodiment, when the last wagon passes the infrastructure, a message is sent to that specific infrastructure to stop transmitting light, and to synchronize with the next following infrastructure.

Further some example embodiments include an optical communication device (OCD) for maintaining steady communication between public transposition vehicles and infrastructure. The optical system may include a diffraction optical element (DOE), a liquid crystal display (LCD), cylinder lens, a laser, a detector, filters, beam splitters, and modulators.

The OCD may further include a computerized unit, accelerometers, and control units. The system, in an embodiment, is configured to determine a location of at least one infrastructure unit along the predetermined route, receiving the speed of train from accelerometers, calculate position of train in respect to the infrastructure, program DOE on LCD, move optical beam to a specific position to impinge the receiver.

In some configuration, the OCD include an optical transmitter configured to transmit light pulses, an optical receiver configured to receive light pulses, and a processing circuitry configured to control the OCD, the LCD, and the accelerometers based on a predetermined route.

Figure 1:
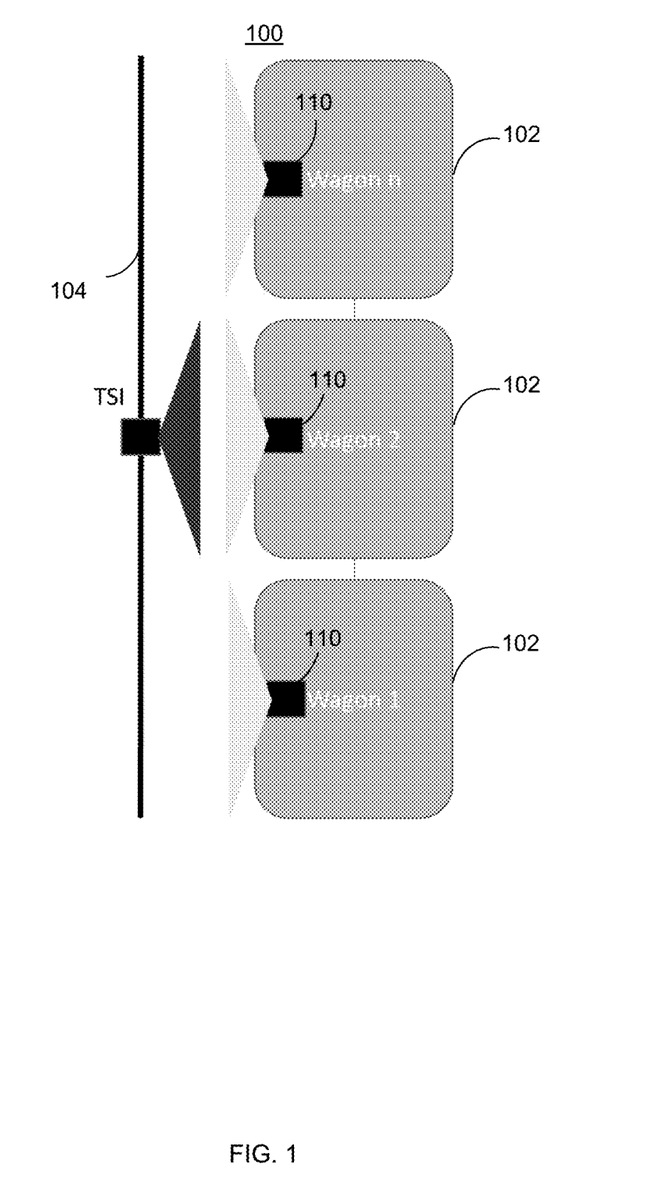
FIG. 1 shows a top-view schematic diagram of train's wagons with the OCD that communicate with track-side infrastructure (TSI), according to an embodiment.

FIG. 1 shows a top-view schematic diagram of a train 100 that contains n wagons 102, each wagon 102 has OCD unit that generates a modulated light (laser, LED) in a shape of a line at wavelength $\lambda_1$. The laser (or LED) line impinges the receiver that is located in the TSI 104, so connectivity is always achieved, even during movement of the train. As indicated from FIG. 1, the result is a continuous light along the entire train that is traveled with the train and thus a constant line of sight is achieved. The wagon 102 is equipped with an OCD 110 that may be mounted, for example, on the roof, allowing for an elevated position for the transmission and reception of optical signals. The OCD 110 is configured to communicate with the infrastructure, such as dedicated communication towers, using optical pulses. In an embodiment, the OCD 110 is configured to operate using infrared light in addition to, or in place of, visible light.

The OCD 110 may include a laser and modulator, small-form factor pluggable (SFP) laser or light emitting diodes (LEDs) which are modulated to give Wi-Fi, Light-Fidelity (LiFi), or any other type of communication between trains and infrastructure. A processor (not shown) may be coupled to the optical receiver and configured to translate the received optical pulses into data, such as a textual string or signature and an optical receiver, where the LEDs are configured to pulse in a manner that an optical receiver on another train or infrastructure unit can detect the pulse.

In an embodiment, each wagon 102 includes a receiver and transceiver, and the wagons communicate directly with each other and are synchronized over visible light communication (VLC), radio-frequency (RF) or other type of wireless or non-wireless communication. In a further embodiment, the communication infrastructure, for example a tower, include a receiver and transceiver and are able to receive and transmit data.

Figure 2:
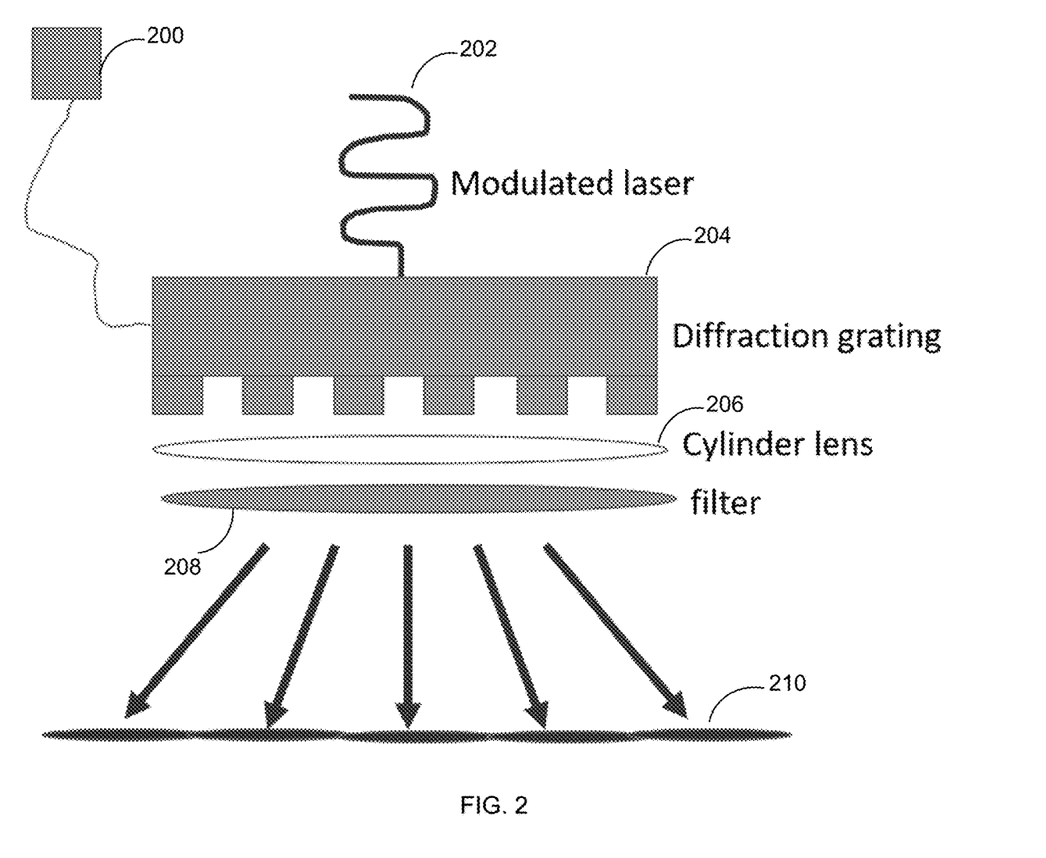
FIG. 2 shows a top view of the OCD unit at every wagon that includes the optical units, according to an embodiment.

FIG. 2 shows the operation of an optical unit in the OCD 110 designed to generate a modulated laser line according to an embodiment. The modulated laser beam 202 first impinges a diffracting optical element (DOE). The DOE may be made from glass, transparent polymer, spatial light modulator (SLM) or programmable liquid crystal display (LCD). After the modulated laser diffraction by the DOE 204, the light is split and diffracted into several beams travelling in different directions. Then, each beam passes through a cylinder lens 206 that elongates the light at one axis and generates a laser line. Now each laser spot (refers to mode) exiting from the DOE 204 becomes a line and hits an optical filter 208 to prevent the transmitted light from the infrastructure to interfere with the transmitted light from the wagon. The positioning of the optical unit can be precisely adjusted as desired. In an example embodiment, the optical unit can be adjusted to transmit an optical beam in the direction of a known infrastructure device 210. As explained in further detail below, this can be particularly useful when applied to an optical communication system implemented on a public transportation vehicle, such as a bus or a train.

In further embodiments, a programmable DOE such as SLM or LCD can be programmed to shift the laser modes to all directions, resulting in a shift of the modulated laser line. This allows producing a laser line in a length of the train's length and even producing a larger length of laser line. As such, the distance between adjacent infrastructures with OCD may be tens of meter plus the length of the train, which is hundreds of meters. A controller and accelerometers 200, may be positioned on the train to control the programmable DOE and change the DOE structure programmed in the LCD or SLM during the train's travel.

In further embodiments, the OCD in the TSI is shut down after the train travels and the last wagon passes through it. A message of closing the OCD 110 in the TSI 104 (see FIG. 1) is obtained by the OCD in the last wagon 102 that transmits the modulated light to the TSI 104. This saves electrical energy to the TSI 104. Before the train's arrival, the OCD in a specific TSI 104 starts to transmit wirelessly optical communication. The message to the TSI 104 to open its OCD is obtained by a control room, radio frequency (RF) signals, Global Positioning System (GPS) or other. The train 100 (see FIG. 1) serves as a mobile relay station, which can provide backup to a train-TSI connection. The OCD 110 can be configured to recognize and anticipate upcoming nearby TSI units based on a current train speed and location along the route. This is achieved by the use of accelerometers 200 or other velocity sensors. For example, based on a known average travel speed, it can be determined that the train 100 will pass by a first TSI 104 within 5 minutes of starting its route.

It should be noted that while a train's route is used as an example, application of the disclosed embodiment is not meant to be limited to trains, and may be implemented in other predetermined routes, such as routes taken by a school bus, routes taken by a mail delivery vehicle, routes taken by a patrol car, and the like.

The train's route includes a starting point and an ending point. Since the train route is known in advance, the location of various infrastructure units, such as the TSI 104 and their distances from the train along the route is a known variable, which allows for solving communication handoff issues more easily.

In an embodiment, the OCDs on each of the TSI 104 are synchronized through a processor. Each OCD is connected with optical fibers, copper wires, or other type of wires or wirelessly to the internet. Inside the train 100, the modulated optical signals may be converted to electrical signals, or RF signals, or to LiFi signals.

Figure 3:
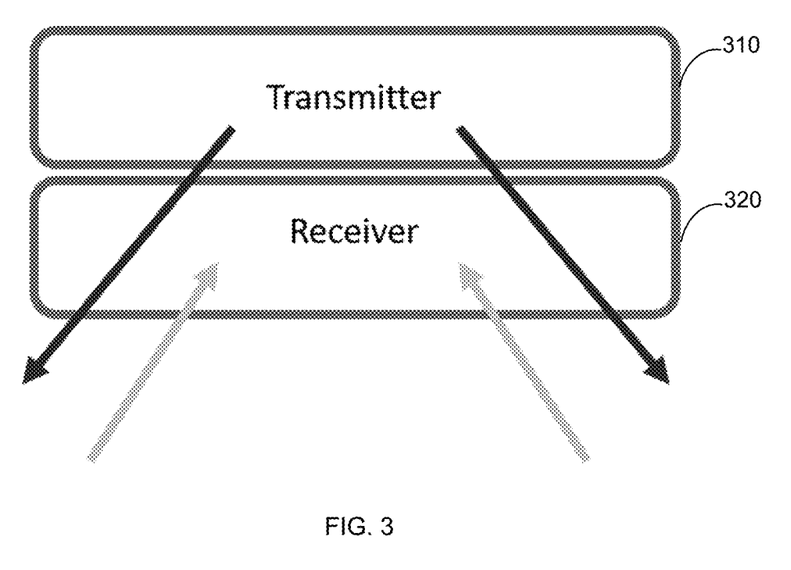
FIG. 3 shows a side-view of the OCD unit at the infrastructure and the wagon, according to an embodiment.

FIG. 3 shows a side view of the optical unit that is installed on the TSI 104 and on the train 100 (see FIG. 1). In an embodiment, the transmitter 310 in the OCD at the wagon 102 is further configured to operate over a specific wavelength $\lambda_1$, and the receiver 320 in the OCD at the wagon is further configured to operate over a different wavelength $\lambda_2$. The transceiver OCD at the infrastructure is further configured to operate over a specific wavelength $\lambda_2$ (same as wavelength of the wagon receiver), and the receiver in the OCD at the wagon is further configured to operate over a different wavelength $\lambda_1$ (same as wavelength of the wagon transceiver) allowing communication with several devices simultaneously and providing different information to each device. Additionally, the OCD may include filters that limit and control the wavelengths emitted such that wagon optical communications are transmitted over a first filtered wavelength, and infrastructure optical communications are transmitted over a second filtered wavelength.

It should be noted that while the disclosed embodiments discuss train routes, the method herein is not meant to be limited to such implementations and may be applied to other scenarios with known or partially-known routes.

In an embodiment, the OCD includes a processing circuitry connected to a memory, at least one optical transmitter, at least one optical receiver, a storage, and a network interface. In another embodiment, the OCD further includes an optical unit that includes a DOE, cylinder lens and a filter. In addition, the includes a velocity sensor or accelerometers, and a controller that are configured to allow adjustment of the DOE.

The processing circuitry may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

In another embodiment, the memory is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions cause the processing circuitry to perform the various optical communication methods disclosed herein. In addition, the instructions may include determining a travel route, updating parameters related to a travel route, updating location information of infrastructure units, determining optimal angles, and the like.

The network interface is configured to allow the OCD to communicate with the various trains and infrastructure via optical signals, such as infrared. As discussed above, the OCD may be installed on the train and on an infrastructure unit, on both, and the like. In an embodiment, the network interface includes a wireless interface configured to connect the OCD with a user device, such as a smartphone, or a vehicle computer, e.g., an on-board computer of a train. The wireless interface may include Wi-Fi, Bluetooth®, Bluetooth Low Energy (BLE), and the like.

The optical transmitter includes one or more light sources (not shown), such as LED lights or lasers, as discussed above. In an embodiment, an array of LED lights or lasers is included within the optical transmitter. The lights are configured to produce short and powerful pulses of light than can be focused via a lens, such as a Fresnel lens, toward a desired location. In an embodiment, the optical transmitter is connected to a power source (not shown), such as a dedicated battery or vehicular energy source. The optical receiver is configured to detect light pulses sent from the train's OCD units. The received light pulses are decoded using the processing circuitry to achieve internet protocols, gain sensory data from the train, fuse sensory data from all the train's sensors, analyze incoming traffic and train information.

In a further embodiment, the OCD includes a controller and accelerometers that re-program the DOE on LCD or SLM in order to adjust the shape of the diffraction modes of the light.

In an embodiment, the OCD further includes a modulator that may be part of SFP, or Ethernet protocol, or according to voice, video, and other sensory data, and is configured to manipulate light pulses transmitted from the optical transmitter of the OCD. The light modulator may include a dual wavelength emitter configured to split a light source from the optical transmitter into two or more wavelength. A first wavelength may be assigned for communication between the OCD on the train and the infrastructure, while a second wavelength may be assigned for communication between the infrastructure and the OCD on the train.

Figure 4:
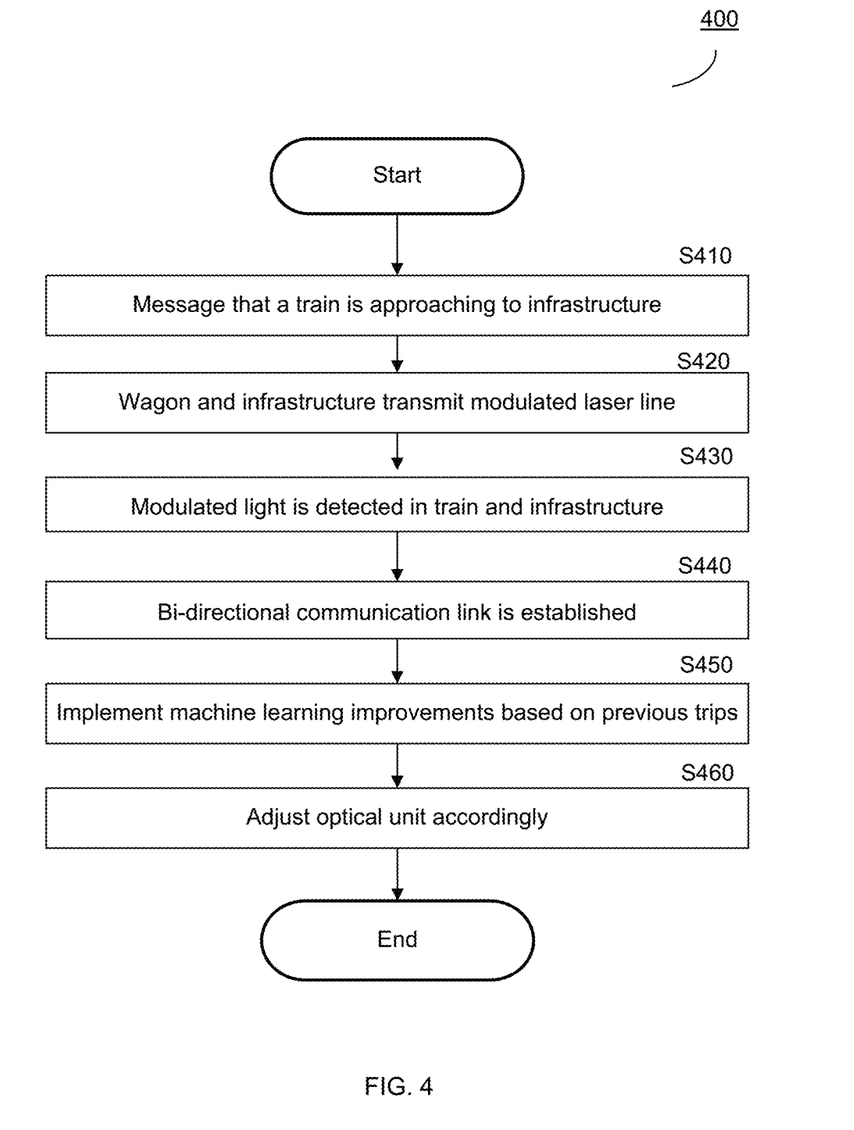
FIG. 4 is a flowchart of a method of producing bi-directional wireless optical communication between train and TSI, according to an embodiment.

FIG. 4 is an example flowchart 400 of a method for a continuous, handoff-free, always line-of-sight optical communication for public transportation vehicles according to an embodiment. The public transportation vehicles include trains, buses and their autonomous versions.

At S410, a predetermined travel route is mapped. In an embodiment, S410 includes determining the length of a predetermined route, such as a route taken by a public transportation vehicle; estimating the time of travel along various sections of the route, and clarifying what directions the train much follow. In an embodiment, the travel route is mapped by accessing route information, e.g., from a public transportation authority website. In addition, various real-time updates may be considered. For example, detours and traffic delays can be accessed, e.g., from the Internet or real-time data sharing apps running on user devices on board a vehicle and incorporated into the travel route. When the train arrives near the infrastructure, a message is sent to the infrastructure, and the OCD at the infrastructure starts to transmit optical signals to the train.

At S420, the wagon and infrastructure transmit modulated laser line, by their OCD installed on each of the wagons. The wagon transmits at wavelength $\lambda_1$, and receives light at different wavelength $\lambda_2$, while the infrastructure transmits at wavelength $\lambda_2$ and receives light at wavelength $\lambda_1$. Both OCDs at the wagon and at the infrastructure generate a modulated laser line by the same optical unit that comprises a DOE that diffracts the light at different locations and cylinder lens that elongate each of the light spots. During the train's travel, a controller based on accelerometers may re-program the DOE to shift the diffraction modes of the light to different angles.

At S430, the modulated light is detected in train and infrastructure, and is converted to electrical pulses, RF pulses or LiFi pulses to establish bi-directional communication link. Optimal angles for the laser line are determined based on the travel route, the speed pf the train through the accelerometers and the control unit. Optimal angles allow to increase the distance between adjacent infrastructure unit along the route of the train.

At S440, a bi-directional communication link is established. When the last wagon passes the infrastructure, a message is sent to that specific infrastructure to stop transmitting light, and to synchronize with the next following infrastructure.

At optional S450, machine learning may be implemented to improve the determined travel route, location of infrastructure units, optimal DOE structure. In an example, the parameters of these settings are saved and stored in a database. After completing each route, the previously determined route parameters can be updated.

According to an embodiment, a machine learning algorithm may be implemented to further optimize and improve the configuration based on the updated information. Thus, any changes to the travel route can be taken into account and used to improve the optical communications of the OCD based on previous and anticipated changes. In a further embodiment, machine learning techniques employed include implementation of one or more neural networks, recurrent neural networks, decision tree learning, Bayesian networks, clustering, and the like, based on the data inputs, e.g., data from multiple vehicles.

At S460, the DOE of the OCD are adjusted based on the determined optimal angles, the machine learning implemented improvements, and any combination thereof.

Figure 5:
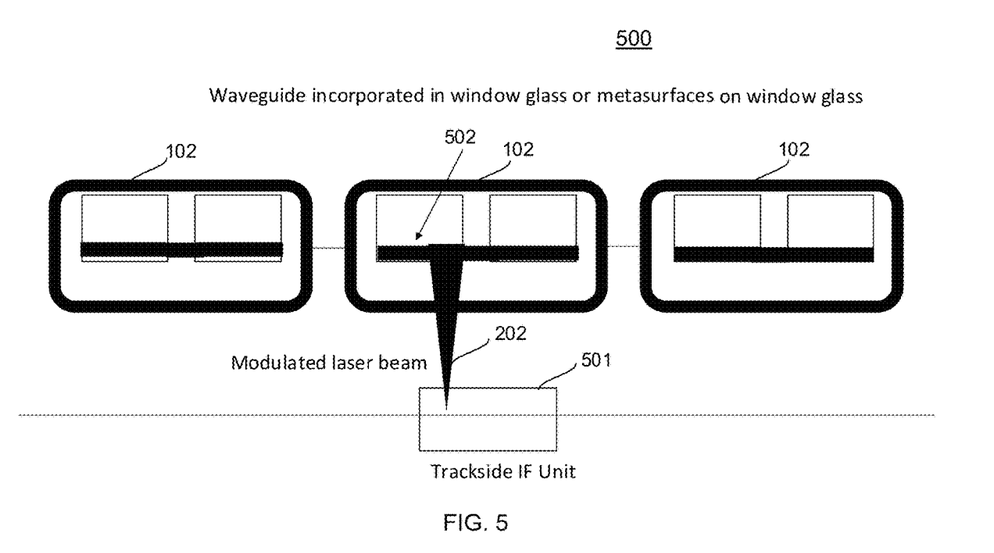
FIG. 5 is a TSI to train communication, according to an embodiment.

FIG. 5 shows TSI to train communication 500, according to an embodiment. TSI-to train communication may be implemented as follows: each glass-made window (or other part of the train) of a train wagon 102 includes a thin waveguide structure 502 with meta-surface or grating depicted in FIG. 6. The modulated laser beam 202 from the TSI unit 502 impinges the train's window.

Figure 6:
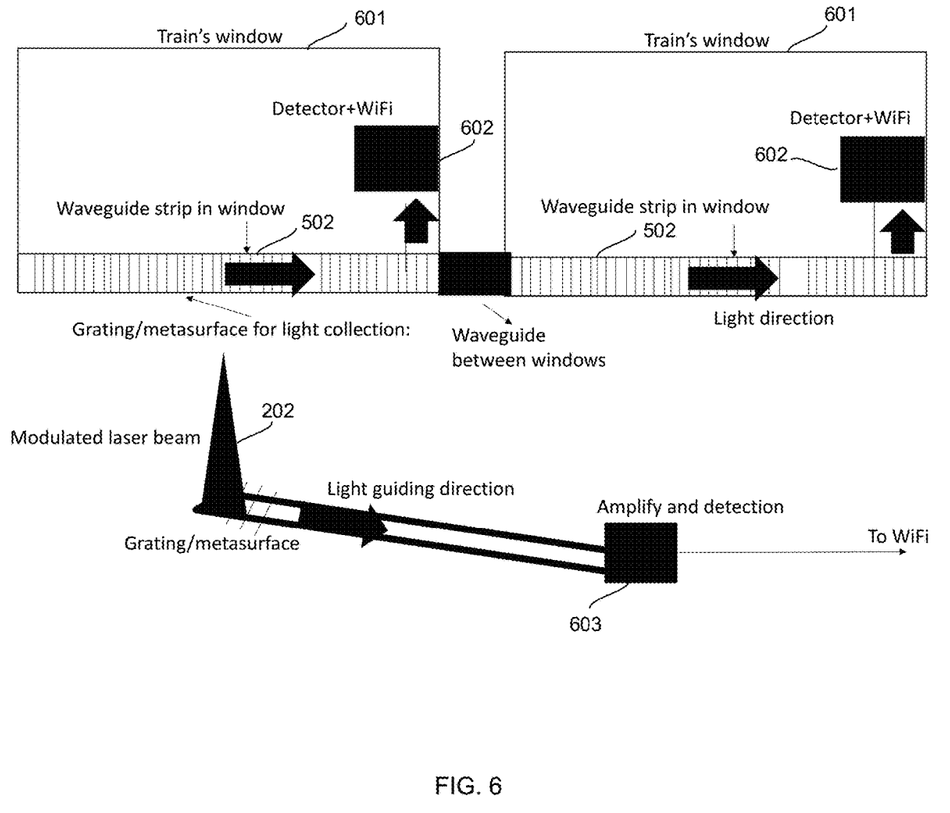
FIG. 6 is a diagram showing the processing of the modulated laser beam, according to embodiment.

FIG. 6 shows processing of the modulated laser beam, according to embodiment. In FIG. 6, when the communication modulated laser beam 202 from the TSI unit 502 impinges the train's window 601, the light is collected, amplified and guided to a detector 602, from which it is transmitted to a Wi-Fi unit from the amplifier 603. In case of LiFi, the light is guided to a remote LiFi unit without optic-to-electric conversion. The beam waist at the train matches the distance between two adjacent windows 601. Each window has a waveguide strip 502 including grating/meta-surface configured to collect light.

Figure 7:
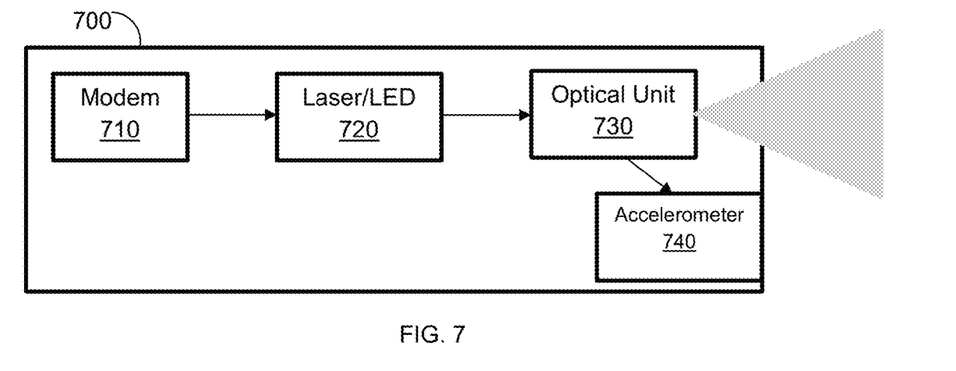
FIG. 7 is a block diagram of an OCD according to an embodiment.

FIG. 7 shows an example block diagram of an OCD 700 according to an embodiment. The OCD 700 includes a modem 710, a laser 720, and optical unit 730. The modem 710 is configured to support any wireless communication via RF signals. The modem 710 may be realized as ToR switch with SFP ports, and/or function generator. The laser 720 is connected modem 710 using a SMA/BNC cable. In an embodiment, the laser 720 may include any of a laser or LED emitting light to the optical unit 730. The optical unit 730 is connected to an accelerometer 740 which may include one or more accelerometers, vibrometers, velocity sensors, and/or GPS. The optical unit 730 generates and emits a modulated laser or LED light to trackside unit.

Figure 8:
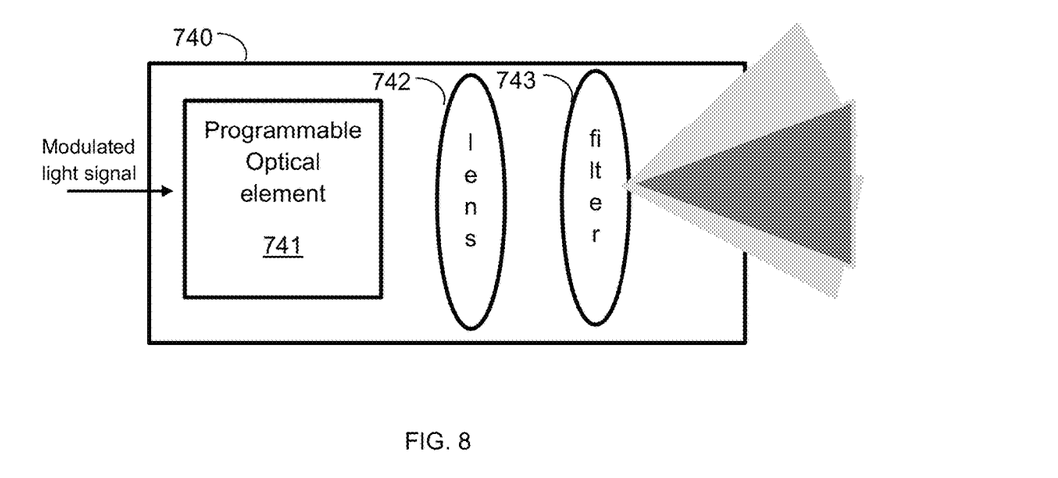
FIG. 8 is a block diagram of an optical unit within the OCD according to an embodiment.

FIG. 8 shows an example block diagram of the optical unit 740 according to an embodiment. The optical unit includes a programmable optical element 741, Powel lens 742, and at least one optical filter 743. These elements are discussed in greater detail above.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for generating a continuous line-of-sight optimized optical communication between a public transportation vehicle and an infrastructure, comprising:
   determining a location of at least one infrastructure unit along a predetermined route;
   detecting an approaching public transportation vehicle;
   determining a speed of the public transportation vehicle by an accelerometer;
   computing a position of the public transportation vehicle with respect to the at least one infrastructure unit based on the speed;
   transmitting a modulated light, via an optical communication device, from the at least one infrastructure unit; and
   establishing a bi-directional link based on a modulated light emitted from the public transportation vehicle and the modulated light from the at least one infrastructure unit based on the position of the public transportation vehicle, wherein the optical communication is over the established bi-directional link.

2. The method of claim 1 further comprising:
   transmitting the modulated light at a first wavelength $\lambda_1$ and receiving light at a second wavelength $\lambda_2$, by the public transportation vehicle; and
   transmitting the modulated light at the second wavelength $\lambda_2$ and to receiving light at the first wavelength $\lambda_1$ by the at least one infrastructure unit.

3. The method of claim 1, further comprising applying machine learning to:
   determine a travel route, the location of the at least one infrastructure unit and an optimal configuration of a diffractive optical element (DOE) located on at least a wagon of the public transportation vehicle based on pre-stored parameters.

4. The method of claim 3, further comprising:
   adjusting the DOE based on the optimal configuration to move an optical beam to a specific position to impinge a receiver.

5. The method of claim 1, further comprising:
   programming a DOE by at least one accelerometer and at least one velocity sensor.

6. The method of claim 1, wherein the public transportation vehicle is at least a train and wherein the method further comprises:
   detecting when a last wagon of the at least a train passes the at least one infrastructure unit; and
   sending a message to the at least one infrastructure unit to stop transmitting the modulated light.

7. A non-transitory computer readable medium having stored thereon instructions for causing a processing circuitry to perform a process for continuous line-of-sight optimized optical communication between a public transportation vehicle and an infrastructure, the process comprising:
   determining a location of at least one infrastructure unit along a predetermined route;
   detecting an approaching public transportation vehicle;
   determining a speed of the public transportation vehicle by an accelerometer;
   computing a position of the public transportation vehicle with respect to the at least one infrastructure unit based on the speed;
   transmitting a modulated light, via an optical communication device, from the at least one infrastructure unit; and
   establishing a bi-directional link based on a modulated light emitted from the public transportation vehicle and the modulated light from the at least one infrastructure unit based on the position of the public transportation vehicle wherein the optical communication is over the established bi-directional link.

8. A system for generating a continuous line-of-sight optimized optical communication between a public transportation vehicle and an infrastructure, comprising:
   a light line generation unit comprising a programmable diffractive optical element (DOE); and
   an optical communication device (OCD) located at a public transportation vehicle operatively connected to the DOE and configured to:
   support a continuous bi-directional communication between the public transportation vehicle and the infrastructure,
   wherein the OCD is configured to transmit light at a first wavelength $\lambda_1$ and to receive light at a second wavelength $\lambda_2$, and wherein the infrastructure is configured to transmit light at the second wavelength $\lambda_2$ and to receive light at the first wavelength $\lambda_1$, wherein the OCD comprises a light modulator configured to manipulate light pulses transmitted from an optical transmitter of the OCD, wherein the light modulator comprises a dual wavelength emitter configured to split a light source from the optical transmitter into two or more wavelengths, and wherein the first wavelength is assigned for communication between the OCD located at a wagon and the infrastructure, and wherein the second wavelength is assigned for communication between the infrastructure and the OCD located at the wagon.

9. The system of claim 8, further comprising:
   a cylinder lens; and a filter connected to the OCD.

10. The system of claim 8, wherein the DOE is programmed by at least one accelerometer and at least one velocity sensor.

11. The system of claim 8, further comprising a controller module configured to:
    detect when a last wagon of the public transportation vehicle passes the infrastructure, and
    send a message to the infrastructure to stop transmitting the light.

12. The system of claim 11, wherein the controller module is further configured to synchronize a wagon of the public transportation vehicle with a following infrastructure.

13. The system of claim 11, wherein the controller module is further configured to:
    apply machine learning to determine a travel route, a location of the infrastructure and an optimal configuration of the DOE located on at least the wagon of the public transportation vehicle based on pre-stored parameters.

14. The system of claim 13, wherein the system is further configured to:

adjust the DOE based on the optical configuration to move an optical beam to a specific position to impinge a receiver.

15. The system of claim 8, wherein the OCD comprises an optical transmitter configured to transmit light pulses and an optical receiver configured to receive light pulses.

16. The system of claim 8, wherein the OCD further comprises:
a controller and at least one accelerometer configured to re-program the DOE to adjust a shape of diffraction modes of the light.

17. A system for generating a continuous line-of-sight optimized optical communication between a public transportation vehicle and an infrastructure, comprising:
a processing circuitry; and
a memory, the memory containing instructions that, when executed by the processing circuitry, configure the system to:
determine a location of at least one infrastructure unit along a predetermined route;
detect an approaching public transportation vehicle;
determine a speed of the public transportation vehicle by an accelerometer;
compute a position of the public transportation vehicle with respect to the at least one infrastructure unit based on the speed;
transmit a modulated light, via an optical communication device, from the at least one infrastructure unit; and
establish a bi-directional link based on a modulated light emitted from the public transportation vehicle and the modulated light from the at least one infrastructure unit based on the position of the public transportation vehicle, wherein the optical communication is over the established bi-directional link.

* * * * *